March 14, 1961 J. F. MITCHELL 2,975,274

FREQUENCY MODULATION RADIO RECEIVER

Filed March 21, 1960

INVENTOR.
John F. Mitchell
BY Mueller & Aichele
Attys.

United States Patent Office 2,975,274

Patented Mar. 14, 1961

2,975,274

FREQUENCY MODULATION RADIO RECEIVER

John F. Mitchell, Berkeley, Ill., assignor to Motorola, Inc., Chicago, Ill., a corporation of Illinois Filed Mar. 21, 1960, Ser. No. 16,231

9 Claims. (Cl. 250—20)

This invention relates generally to frequency modulation radio receivers, and more particularly to a discriminator-detector circuit for use in a radio receiver having a transistor limiter stage.

This application is a continuation-in-part of the applicant's copending application Serial No. 715,028 filed February 13, 1958, since forfeited.

Frequency modulation radio receivers may include one or more limiter stages which remove any variations in amplitude from the frequency modulated carrier wave which are acquired in transmission and reception. A limiter stage using a transistor rather than a tube may be used in such receivers, but due to variations in the output impedance of a limiting transistor it has been difficult to obtain good linearity in the discriminator-detector portion of the receiver.

It is one object of this invention to provide an improved transistorized frequency modulation radio receiver.

Another object of the invention is to provide a new and improved discriminator-detector circuit for use in a frequency modulation radio receiver having a transistor limiter stage.

Still another object of the invention is to provide a discriminator-detector circuit in which the discriminator portion thereof, which is coupled to the output of the limiter stage, is not loaded by the limiter stage.

A feature of the invention is the provision of a discriminator-detector circuit having a discriminator section including a first portion providing coupling out of a transistor limiter, and a second portion providing coupling into the detector section which is substantially independent of the coupling out of the limiter.

Another feature of the invention is the provision of a frequency modulation communications system including a limiter stage with a transistor having an output resonant circuit which is loaded by the transistor as the output impedance of the transistor decreases during limiting, and further including a discriminator-detector stage having a second resonant circuit which is coupled to the output circuit of the limiter stage and which becomes decoupled during limiting so as to prevent loading of the second resonant circuit by the transistor, and a third resonant circuit coupled to the second resonant circuit to provide the proper phase relationships for frequency discriminating action.

A further feature of the invention is the provision in a frequency modulation radio receiver of a discriminator-detector circuit having a discriminator section including a first winding which is inductively coupled to the tank circuit of a transistor limiter and with a second winding which is inductively coupled to a tuned circuit of the discriminator so that the second winding is not loaded by the limiter.

A still further feature of the invention is the provision of a frequency modulation radio receiver having a transistor limiter stage and a discriminator-detector circuit including a coil which is lightly coupled to the limiter stage by a capacitor and which is inductively coupled to a tuned circuit connected to the detector section of the discriminator-detector circuit so that the coil is not loaded by the limiter.

The invention is illustrated in the accompanying drawing in which.

In accordance with the invention, a frequency modulation radio receiver is provided with a transistor limiter stage and a discriminator-detector circuit which gives an output having an amplitude response which varies linearly with change in frequency despite fluctuations in the output impedance of the limiter stage. The receiver includes a discriminator-detector circuit having a tuned circuit in which frequency discriminating action takes place. A resonant circuit has a first winding inductively coupled to the tuned circuit and has a link winding which lightly couples the first winding to the transistor limiter stage. Consequently, variations in the output impedance of the transistor as it goes into and out of limiting do not substantially affect the coupling provided by the first winding. A capacitor is connected in series with the two windings of the resonant circuit, and the junction between this capacitor and the first winding is connected to a tap in either the inductive or the capacitive branch of the tuned circuit so that voltages having predetermined phase relationships are added together and impressed on diode elements which provide the detector action. The link winding may be replaced by a capacitor to form an alternate embodiment since the light coupling out of the limiter stage may be of the mutual capacitive type as well as of the mutual inductive type.

Figure 1:
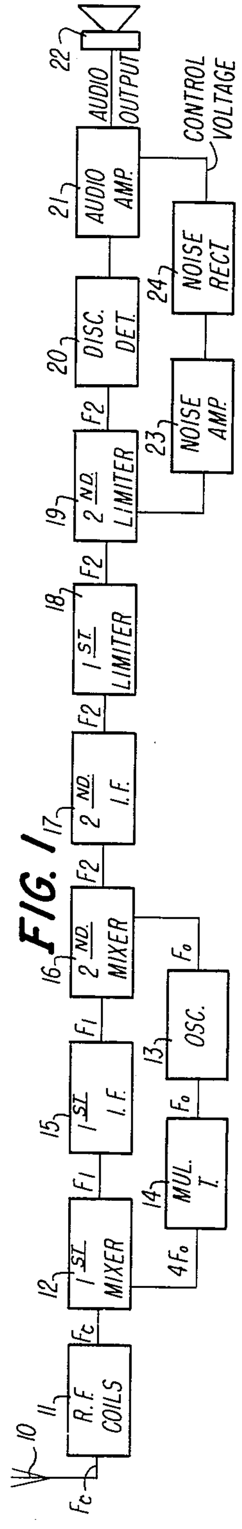
Fig. 1 is a block diagram of a transistorized frequency modulation radio receiver.

A frequency modulation radio receiver is shown in block diagram form in Fig. 1. The radio receiver illustrated here is a transistorized dual conversion type which is adapted to be packaged along with a transmitter unit to provide complete portable two-way communications in a single unit which weighs as little as 7½ pounds. Frequency modulated carrier wave signals picked up by the antenna 10 are coupled to the radio frequency coils 11 which provide frequency selection, and the selected signals pass to a first mixer stage 12 where the desired carrier frequency $F_c$ is beat-down to a first intermediate frequency $F_1$. A local oscillator signal used to provide heterodyning action in the first mixer 12 is supplied by the oscillator 13 at a frequency $F_0$ and is increased to a frequency of four times $F_0$ by the multiplier 14. The heterodyned signal is amplified by the first intermediate frequency amplifier 15, which may include a plurality of stages, and suitable tuned circuits provide maximum attenuation of the intermediate frequency image. The signal is then beat-down to a second intermediate frequency $F_2$ by the second mixer 16 which is supplied with the local oscillator signal at a frequency $F_0$. The resulting signal is amplified by the second intermediate frequency amplifier 17, which may also include a plurality of stages. The peaks of the carrier wave of frequency $F_2$ are clipped by the first and second limiter stages 18 and 19, and the output of the second limiter is coupled into the discriminator-detector stage 20, which translates the frequency modulation variation of the carrier wave to an audio frequency signal. The audio signal is amplified by an audio amplifier 21, which may also include more than one stage, and the audio output is converted into sound by the transducer 22, which may be a loudspeaker or a headset. Squelch action is provided by decoupling audio noise from the second limiter stage 19, amplifying that portion of the noise above the normal voice frequency range in the stage 23, rectifying this noise in stage 24, and applying it as a control voltage to the audio amplifier 21 to cut off the audio output when the receiver is not quieted.

Figures 2, 6:
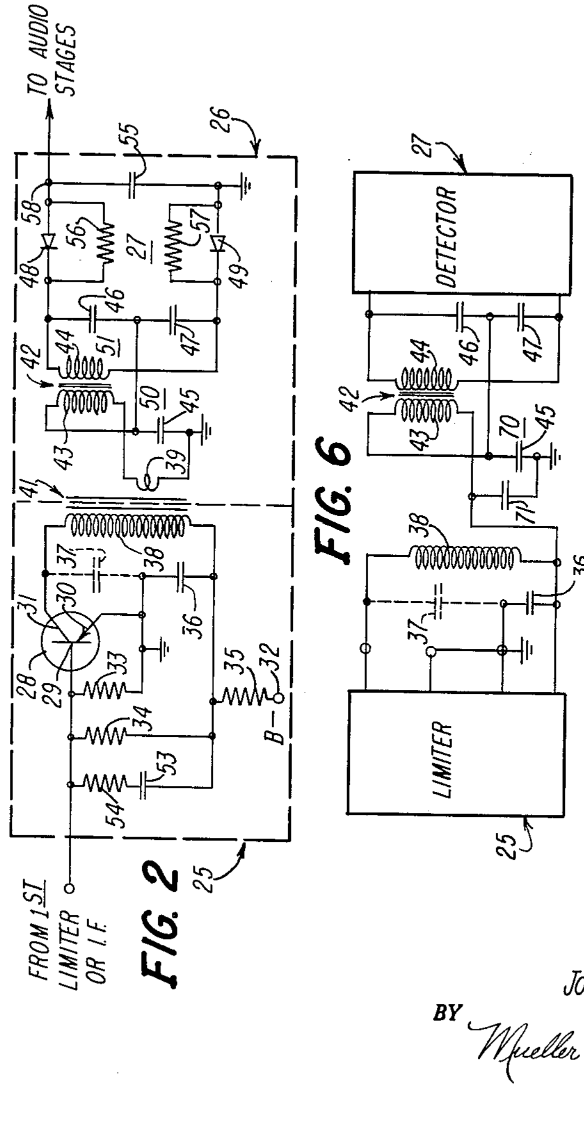
Fig. 2 is a circuit diagram showing the circuits of a transistor limiter and a discriminator-detector in accordance with one embodiment of the invention.
Fig. 6 is a circuit diagram for another embodiment of the invention.

The circuits of a transistor limiter 25 and a discriminator-detector 26 suitable for use in frequency modulation radio receivers, such as the receiver shown in Fig. 1, are shown in Fig. 2. The limiter 25 includes a transistor 28 of the P-N-P junction type having a base 29, an emitter 30 and a collector 31. The emitter 30 is grounded, and B— potential is supplied to the collector 31 from the supply line terminal 32 through resistor 35 and winding 38 of the transformer 41. The primary winding 38 of transformer 41 has a number of turns which provides impedance matching with the normal output impedance value of the transistor 28. As shown in Fig. 2, the secondary winding 39 of transformer 41 has substantially fewer turns and therefore a lower impedance value than the primary winding 38 so that the transformer 41 is a step-down coupling element which provides satisfactory energy transfer from the limiter 25 to the discriminator-detector 26. The resistor 33 connected across the emitter-base electrodes and the resistor 34 connected across the collector-base electrodes form a voltage divider which biases the base 29 negatively with respect to the emitter 30 and positively with respect to the collector 31.

A frequency modulated carrier wave signal is supplied from a previous stage, such as an intermediate frequency amplifier or a first limiter, to the base 29 of the transistor 28, and the output of the limiter 25 is applied to the primary winding 38 of the transformer 41, which forms the input to the discriminator-detector 26. A capacitor 36 connected from one end of the winding 38 to ground and a resistor 35 connected from the same end of winding 38 to the B— terminal 32 provide decoupling of the output signal so that it does not appear on the direct current supply line. Winding 38, capacitor 36, and the output capacity of the transistor 28, which is shown in dotted lines as a capacity 37, form a resonant tank circuit which is tuned to the center frequency $F_2$ of the carrier wave. The capacities 36 and 37 form a capacitive voltage divider which is connected by a feedback circuit consisting of the capacitor 53 and resistor 54 to the base 29 of the transistor. Thus, a portion of the radio frequency output developed across capacitor 36 is fed back to the input of the limiter to neutralize feedback through the internal collector-base capacity of the transistor 28. This prevents oscillations which might otherwise occur since the stage is operated at a high gain of the order of 30 decibels.

The resonant circuit 50 includes winding 39, winding 43 and capacitor 45. Winding 39 is preferably a link which inductively couples the winding 43 lightly to the tank circuit of the limiter stage 25 so that the coupling between winding 43 and the limiter stage approaches zero during clipping of the positive peaks of the collector voltage to prevent loading of winding 43. The coupling to the tank circuit of the limiter may be any amount from very light up to what is called "critical" coupling which provides maximum energy transfer. A more tight coupling would reduce the effectiveness of the isolation as well as reduce the transfer of energy.

Winding 43 forms the primary of a transformer 42 which has a tuned secondary 44 connected to the detector section 27, and the inductive coupling provided by winding 43 is substantially independent of the varying coupling out of the limiter stage 25 provided by winding 39. The capacitor 45 is connected in series with the windings 39 and 43, and the loop formed thereby is tuned to the center frequency of the carrier wave. The secondary winding 44 of the transformer 42 and capacitors 46 and 47 form a parallel resonant circuit 51 which is also tuned to the center frequency of the carrier wave. The resonant circuit 51 is connected to a pair of rectifier diodes 48 and 49 which have load resistors 56 and 57 connected across them.

Figure 3:
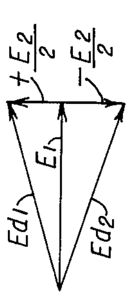
Fig. 3 is a vector diagram illustrating the discriminator action shown in Fig. 2.

The sinusoidal voltage $E_1$ developed across the capacitor 45 is represented by a vector E1 in the vector diagram shown in Fig. 3. At the carrier frequency, the voltage developed across the primary 43 is substantially equal in amplitude and opposite in phase to $E_1$, and as this voltage increases and decreases, an E.M.F. is induced in the secondary 44 which is approximately 180° out of phase with $E_1$. The circulating current through the secondary 44 is in phase with the induced E.M.F. since this circuit is in resonance, and the external sinusoidal voltage $E_2$ developed across the capacitors 46 and 47 leads the circulating current by 90° and therefore is in quadrature with the voltage E1. The radio frequency voltage impressed on the diode 48 is $E_1$ plus half of $E_2$, and the radio frequency voltage impressed on diode 49 is $E_1$ minus half of $E_2$. This addition is accomplished by placing the common junction between capacitors 46 and 47 at the potential of the junction between capacitor 45 and winding 43. The additions are illustrated in Fig. 3 where the diode voltages are indicated by vectors ED1 and ED2.

Figure 4:
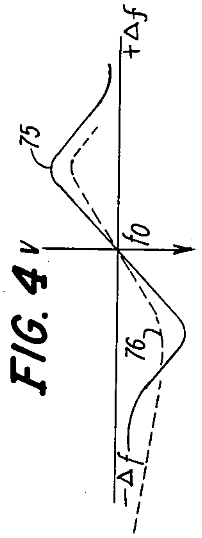
Fig. 4 is a plot of potential versus frequency change at the output of the detector shown in Fig. 2.

At resonance, the radio frequency voltages impressed on diodes 48 and 49 are equal, and consequently the rectified voltages supplied to the capacitor 55 are equal and opposite in phase so that the output potential at point 58 with respect to ground is zero. As the frequency of the carrier wave fluctuates above and below resonance due to the frequency modulation component, $E_2$ varies around the quadrature position with respect to $E_1$, and the potential of point 58 swings positive and negative with respect to ground providing an amplitude response that varies substantially linearly with changes in the impressed frequency, as indicated by the curve 75 in Fig. 4.

In order to obtain proper discriminator action, it is apparent that the phase relationship of voltages $E_1$ and $E_2$ must be carefully controlled. Any variation in the coupling into the tuned circuit 51 formed by winding 44 and capacitors 46 and 47 tends to cause spurious deviation from the desired quadrature relationship. Coupling out of a transistor limiter does vary somewhat when the transistor is in the limiting mode. This can be understood by a consideration of the static characteristic curves of a typical transistor such as transistor 28 of limiter stage 25 as illustrated in Fig. 5.

Figure 5:
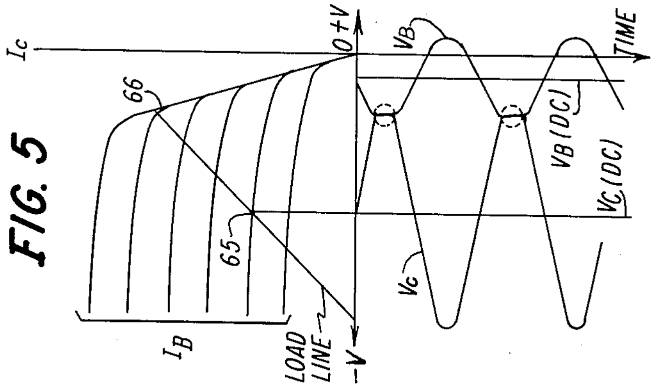
Fig. 5 is a plot showing static characteristic curves of a transistor for use in the limiter shown in Fig. 2.

Fig. 5 shows the variation of collector voltages ($V_c$) and collector current ($I_c$) at different base currents ($I_b$) and base voltages ($V_b$). As previously mentioned, the emitter 30 of transistor 28 is grounded, the base electrode is D.C. biased to a slightly negative voltage indicated by the line $V_b$ (D.C.), and the collector is biased negatively with respect to the base as indicated by the line $V_c$ (D.C.) which places the operating point on the load line of the transistor at point 65. The excursion of the collector current $I_c$ in response to an applied signal is along the load line. As $V_b$ swings negatively, $V_c$ swings positively, and when the amplitude of the applied voltage is relatively high as is necessary in order to provide limiting, $I_c$ moves along the upper right-hand portion of the load line until it reaches the saturation level at point 66.

As the base voltage $V_b$ tends to swing still further in a negative direction in response to the applied signal, the collector-to-base diode becomes biased in the forward direction. Consequently, the collector-to-base diode becomes a low impedance and draws relatively large current which flows from the collector 31 to the base 29 and returns to ground through the bias resistor 33. Since this current flow is in the reverse direction and opposes the normal bias current, the base voltage moves in the positive direction. As $V_b$ starts to swing in a positive direction, $V_c$ swings negatively until $I_c$ is cut off. Thus, the transistor is driven from cutoff to saturation by the applied signal, and the positive peaks of the output signal are clipped to remove any amplitude variation which may be present in the carrier wave thus making the output waves from the limiter 25 non-sinusoidal. Since the negative peak is beyond cutoff, any amplitude response on this peak is also removed.

This limiting action adversely affects known discriminator-detector circuits where the discriminator-detector is directly coupled to the tank circuit of a transistor limiter, because the Q of the tank circuit is reduced when the transistor switches from a high output impedance to a low output impedance during limiting of the positive output peaks as explained above. When the Q of the tank circuit changes, the relationship of $E_1$ and $E_2$ of Fig. 3 is altered, and this causes the output of the detector to deviate from the desired amplitude response, with such deviation being illustrated by the dotted curve 76 in Fig. 4. It may be noted that the amplitude of curve 76 is not as great as the amplitude of curve 75, and that the linear portion of curve 76 is correspondingly shorter. Thus, the use of the detector for translation of frequency variations into amplitude variations over the entire response range will introduce some distortion. The response of curve 76 is also unequal about $F_0$ which further increases distortion.

The discriminator circuit of the invention surmounts this difficulty because the coupling from the resonant circuit 50 into the resonant circuit 51 provided by winding 43 is not substantially affected by variations in the Q of the tank circuit of the limiter. The resonant circuit 50 is effectively decoupled from the limiter during the loading of the limiter's tank circuit by the transistor 28, so the transistor does not load the resonant circuit 50. The coupling between the limiter's tank circuit and the circuit 50 may be critical or less. Although non-sinusoidal waves produced by the limiting action described above are induced in the winding 39, the resonant action of circuit 50 attenuates the non-sinusoidal components and accentuates the main sinusoidal component so that the desired sinusoidal waves are produced in the resonant circuit 50 and also in the resonant circuit 51. The limiter's tank circuit and the circuits 50 and 51 may together provide an overall optimum flat response. The proper phase relationships are obtained in the reconant circuit 51 as previously explained, and proper discriminator action is obtained in the resonant circuit 51 so that the output amplitude response corresponds to curve 75 of Fig. 4.

An alternate embodiment of the invention is illustrated in Fig. 6. Only a portion of the circuit is shown, and since most of the components are the same as those shown in Fig. 2, these will not be re-described in detail. In this embodiment, the light coupling between the limiter stage 25 and the discriminator-detector 26 is provided by a capacitor 71 forming a part of the resonant circuit 70. This is shown to illustrate that coupling out of the limiter stage 25 may be either of the mutual inductive type or of the mutual capacitive type.

It has been found that frequency modulation radio receivers having a transistor limiter stage and a discriminator-detector stage in accordance with the invention operate properly despite changes in the output impedance of the transistor used in the limiter. The discriminator circuit described herein is simple and does not substantially increase the cost of making the receiver considering the resulting improvement in performance.

I claim:

1. In a frequency modulation communication system, the combination including, limiter means including a transistor having an output portion whose impedance value decreases substantially during limiting, a first resonant circuit connected to said output portion of said transistor and loaded by said transistor as the impedance value of said output portion decreases, a second resonant circuit including reactance means coupling said second resonant circuit to said first resonant circuit and effectively decoupling the same as said first resonant circuit is loaded by said transistor, a third resonant circuit, means coupling said third resonant circuit to said second resonant circuit to provides waves out of phase with each other in said third resonant circuit, and detector means connected to said third resonant circuit for providing demodulated signals and having an amplitude response varying substantially linearly with frequency change, said detector means being effectively isolated by said second resonant circuit from the loading effect of said transistor.

2. In a frequency modulation communication system, the combination including, limiter means providing non-sinusoidal waves and including a transistor having an output portion whose impedance value decreases substantially during limiting, a first resonant circuit connected to said output portion of said transistor and loaded by said transistor as the impedance value of said output portion decreases, a second resonant circuit for producing first sinusoidal waves, reactance means in said second resonant circuit lightly coupling said second resonant circuit to said first resonant circuit and effectively decoupling the same as said first resonant circuit is loaded so as to prevent loading of said second resonant circuit by said transistor, a third resonant circuit coupled to said second resonant circuit and deriving therefrom sinusoidal waves in quadrature phase relation with each other, and detector means connected to said third resonant circuit for deriving from said sinusoidal waves demodulated signals having an amplitude response which is substantially unaffected by the loading produced by said transistor.

3. In a frequency modulation communication system, the combination including, limiter means including a transistor having an output portion whose impedance value decreases substantially during limiting, a first resonant circuit connected to said output portion of said transistor and loaded by said transistor as the impedance value of said output portion decreases, a second resonant circuit including reactance means coupling said second resonant circuit to said first resonant circuit and effectively decoupling the same as said first resonant circuit is loaded by said transistor, a third resonant circuit coupled to said second resonant circuit and having an inductive branch and a capacitive branch, one of said branches having a tap, circuit means connecting said tap to said second resonant circuit so as to provide sinusoidal waves having a quadrature phase relationship in said third resonant circuit, and detector means connected to said third resonant circuit to derive from said sinusoidal waves demodulated signals having an amplitude response which is substantially unaffected by the loading produced by said transistor.

4. In a frequency modulation communication system the combination including, limiter means providing non-sinusoidal waves and including a transistor having an output impedance which fluctuates between a high impedance value and a low impedance value during limiting, step-down coupling means connected to said limiter means for transforming the output impedance of said transistor and including a low impedance element providing a source of non-sinusoidal waves, an inductor, a capacitor, a series resonant circuit including said low impedance element, said inductor, and said capacitor for providing sinusoidal waves, a parallel resonant circuit including a capacitive branch, and an inductive branch coupled to said inductor of said series resonant circuit, said parallel resonant circuit having a tap in one of said branches, circuit means connecting said tap to said series resonant circuit for providing in said parallel resonant circuit sinusoidal waves of quadrature phase relation with each other, and detector means connected to said parallel resonant circuit for providing demodulated signals with an amplitude response varying substantially linearly with frequency change despite the impedance fluctuations of said limiter means.

5. In a frequency modulation communication system including a limiting stage which produces non-sinusoidal waves and which has a transistor with an output portion having an impedance fluctuating between a high impedance value and a low impedance value during limiting, a discriminator system for providing frequency modulation detection action which is not substantially affected by such impedance fluctuations, including in combination, step-down coupling means having a high impedance element connected to the output portion of the transistor and including a low impedance linking element providing a source of non-sinusoidal waves, a transformer having a primary winding connected to said linking element of said coupling means and also having a secondary winding, capacitor means connected to said primary winding of said transformer forming a series resonant circuit therewith for providing first sinusoidal waves, further capacitor means connected to said secondary winding of said transformer forming a parallel resonant circuit therewith, circuit means interconnecting said series resonant circuit and said parallel resonant circuit for providing in said parallel resonant circuit second sinusoidal waves of leading quadrature phase relative with said first sinusoidal waves and third sinusoidal waves of lagging quadrature phase relation with said first sinusoidal waves, and detector means connected to said second resonant circuit for providing demodulated signals with an amplitude response varying substantially linearly with frequency change.

6. In a frequency modulation communications receiver the combination including, limiter means providing non-sinusoidal waves and including a transistor having an output impedance which fluctuates between a high impedance value and a low impedance value during limiting, a step-down transformer including a high impedance primary coil connected to said limiter means and a low impedance linking secondary coil providing a source of non-sinusoidal waves, an inductor, a capacitor, a series resonant circuit including said linking coil, said inductor, and said capacitor for providing first sinusoidal waves, a parallel resonant circuit including a capacitive branch, and an inductive branch coupled to said inductor of said series resonant circuit, said parallel resonant circuit having a tap in one of said branches, circuit means connecting said tap to said series resonant circuit for providing in said parallel resonant circuit second sinusoidal waves of leading quadrature phase relation with said first sinusoidal waves and third sinusoidal waves of lagging quadrature phase relation with said first sinusoidal waves, and detector means connected to said parallel resonant circuit for providing demodulated signals with an amplitude response varying substantially linearly with frequency change despite the impedance fluctuations of said limiter means.

7. In a frequency modulation radio receiver including a limiting stage which produces non-sinusoidal waves and which has a transistor having an output portion with an impedance fluctuating between a high impedance value and a low impedance value during limiting, a discriminator system for providing frequency modulation detection action which is not substantially affected by such impedance fluctuations, including in combination, a first transformer having a primary portion connected to the output portion of the transistor and having a linking secondary portion, said primary portion having a number of turns to match the high impedance value of the transistor, and said linking secondary portion having substantially fewer turns than said primary portion to provide a low impedance source of non-sinusoidal waves, a second transformer having a primary portion connected to said linking secondary portion of said first transformer and also having a secondary portion, capacitor means connected to said primary portion of said second transformer forming a series resonant circuit therewith for providing sinusoidal waves, capacitor means connected to said secondary portion of said second transformer forming a parallel resonant circuit therewith, circuit means interconnecting said series resonant circuit and said parallel resonant circuit for providing in said parallel resonant circuit sinusoidal waves of quadrature phase relation with each other, and detector means connected to said parallel resonant circuit for providing demodulated signals with an amplitude response varying substantially linearly with frequency change.

8. In a frequency modulation radio receiver the combination including, limiter means providing non-sinusoidal waves and including a transistor having an output impedance which fluctuates between a high impedance value and a low impedance value during limiting, step-down coupling means including a high impedance coil connected to said limiter means and a low impedance linking capacitor for providing a source of non-sinusoidal waves, an inductor, a second capacitor, a series resonant circuit including said linking capacitor, said inductor, and said second capacitor for providing first sinusoidal waves, a parallel resonant circuit including a capacitor branch, and an inductive branch coupled to said inductor of said series resonant circuit, said parallel resonant circuit having a tap in one of said branches, circuit means connecting said tap to said series resonant circuit for providing in said parallel resonant circuit second sinusoidal waves of leading quadrature phase relation with said first sinusoidal waves and third sinusoidal waves of lagging quadrature phase relation with said first sinusoidal waves, and detector means connected to said parallel resonant circuit for providing demodulated signals with an amplitude response varying substantially linearly with frequency change despite the impedance fluctuations of said limiter means.

9. In a frequency modulation communications receiver including a limiting stage which produces non-sinusoidal waves and which has a transistor having an output portion with an impedance fluctuating between a high impedance value and a low impedance value during limiting, a discriminator system for providing frequency modulation detection action which is not substantially affected by such impedance fluctuations, including in combination, step-down coupling means including a high impedance coil connected to the output portion of the transistor and a low impedance linking capacitor providing a source of non-sinusoidal waves, a transformer having a primary winding connected to said linking capacitor of said coupling means and also having a secondary winding, first capacitor means connected to said primary winding of said transformer forming a series resonant circuit therewith for providing sinusoidal waves, second capacitor means connected to said secondary winding of said transformer forming a parallel resonant circuit therewith, circuit means interconnecting said series resonant circuit and said parallel resonant circuit for providing in said parallel resonant circuit sinusoidal waves of quadrature phase relation with each other, and detector means connected to said parallel resonant circuit for providing demodulated signals with an amplitude response varying substantially linearly with frequency change.

References Cited in the file of this patent

UNITED STATES PATENTS

| | | |
|---|---|---|
| 2,527,617 | Berger | Oct. 31, 1950 |
| 2,860,239 | Clark | Nov. 11, 1958 |
| 2,912,573 | Mitchell | Nov. 10, 1959 |
| 2,915,603 | Jacobsen | Dec. 1, 1959 |